(No Model.)
G. MAYR.
ELECTRIC LAMP FOR BICYCLES.
No. 508,482. Patented Nov. 14, 1893.
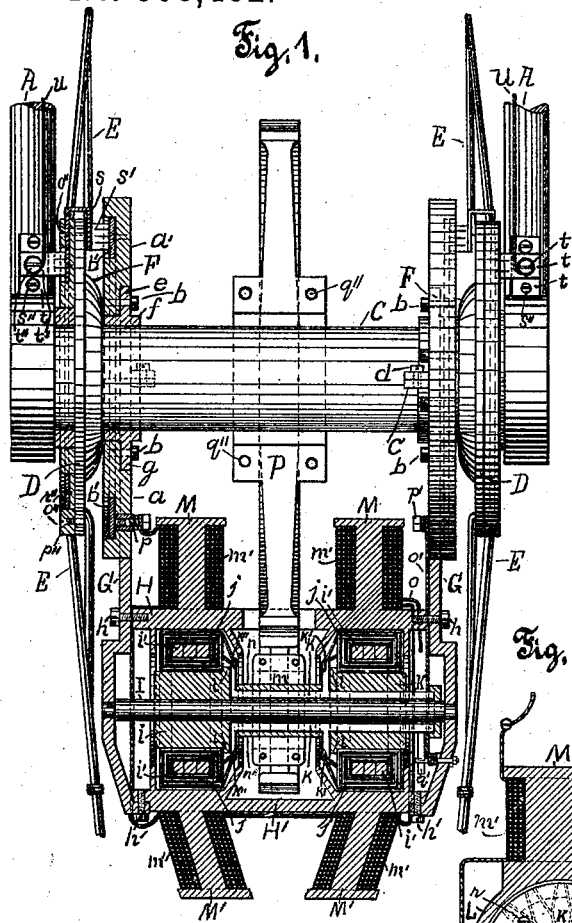
Fig. 1.
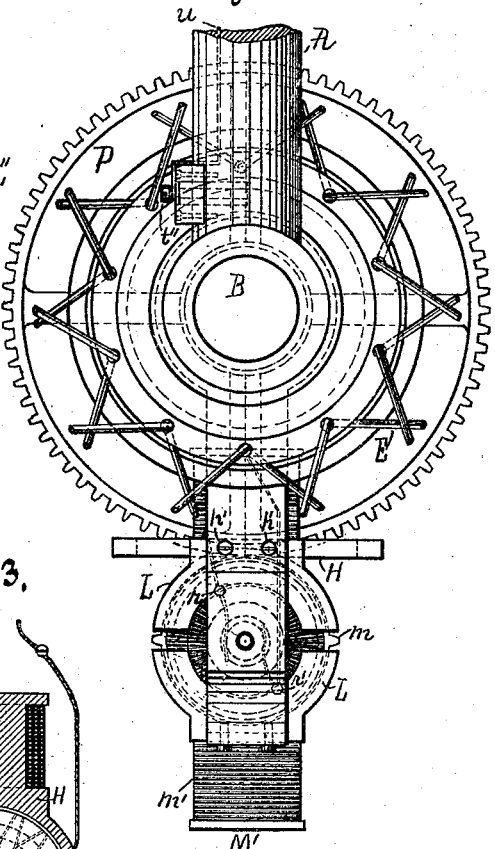
Fig. 2.
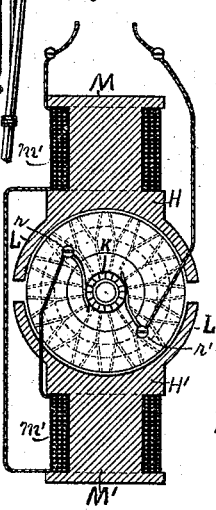
Fig. 3.
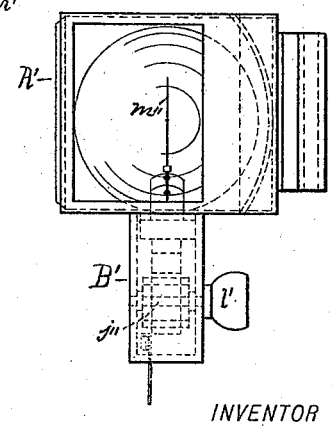
Fig. 4.
Fig. 5.
WITNESSES:
INVENTOR
George Mayr,
BY A. Clinton Tanner,
ATTORNEY.

UNITED STATES PATENT OFFICE.

GEORGE MAYR, OF BROOKLYN, ASSIGNOR OF ONE-HALF TO ELKIN FARMER, OF NEW YORK, N. Y.

ELECTRIC LAMP FOR BICYCLES.

SPECIFICATION forming part of Letters Patent No. 508,482, dated November 14, 1893.

Application filed March 27, 1893. Serial No. 467,836. (No model.)

*To all whom it may concern:*

Be it known that I, GEORGE MAYR, a citizen of the United States, residing at Brooklyn, in the county of Kings and State of New York, have invented certain new and useful Improvements in Electric Lamps for Bicycles, which improvements are fully set forth in the following specification and accompanying drawings, in which—

Figure 1 is a front view of the axial or central portion of a bicycle-wheel, having a spur-wheel mounted upon, and a dynamo-electric machine suspended from the hub thereof, the view being chiefly in section. Fig. 2 is a side elevation of same. Fig. 3 is a detailed side view of the dynamo employed, showing the form of the field-magnets thereof, in section, and the commutator connections. Fig. 4 is a front elevation, partly in section, showing the lamp, and certain means employed for regulating the intensity of the current-electricity which reaches the lamp. Fig. 5 is a side elevation of Fig. 4.

Similar reference-letters denote like parts in the different views.

This invention relates, generally, to that class of appliances known as bicycle-lamps, and particularly to that form of bicycle-lamp in which the production of light is effected through the medium of current-electricity, the latter being generated by means of a dynamo-electric machine. Its objects are to provide an electric lamp for bicycles in which the current-electricity shall be generated by means of a dynamo-electric machine, the disposition of which shall be such as to render practicable the communication thereto of motion from one wheel of a bicycle, upon the latter being rotated or turned upon its axis; wherein the current-electricity may be duly and automatically regulated; which shall admit of ready application to suitable parts of a bicycle; and which shall be simple and comparatively cheap in construction.

The invention consists of the novel arrangement and disposition of the various parts, and of certain details of construction, all of which will be specifically referred to hereinafter.

Referring to the drawings, the letter A denotes the respective arms of that portion of a bicycle known as the "fork," the same being connected at the lower ends thereof, by the horizontal rod B, (Fig. 2,) upon which the bicycle-wheel rotates.

The letter C denotes the hub of the wheel, which is provided with the flanges D, into which take the wire-spokes E, the said hub being also provided with the chambers F, for the reception of bearing-balls. The parts thus far referred to are of ordinary construction.

The flanges D being located one at either end of the hub C, and the respective series of spokes E diverging accordingly from the felly of the wheel, ample space is left for the insertion intermediate of the two series of spokes, and the suspension from the hub of the bicycle-wheel, of a suitably-constructed dynamo-electric machine; and to this end I have devised a dynamo-electric machine of somewhat peculiar construction, and make use of certain relative parts, all of which will now be specifically described.

The arms G preferably of cast-iron extend downward from the hub C, one from a point adjacent to the inner side of either of the chambers F, and are connected centrally by the soft-iron piece H, and at the lower ends thereof by a similar soft-iron piece H', the joining of said soft-iron pieces to said arms, being effected by means of the screws $h$, $h'$. Each of the arms G is provided with a semi-circular head, preferably formed integral therewith, and having the flange $g$, which head conforms to, and is adapted to take around the lower half of the hub C. This head is shown in dotted lines in Fig. 2.

I place upon the hub C the semi-collars $f$, each having a flange $e$, and each conforming to and being adapted to take around the upper half of said hub. These semi-collars $f$, are respectively connected, upon either side of the hub C, to the heads of the arms G, as by means of the bolts $d$, the heads of the arms G and the said semi-collars $f$, being provided with the projections $c$, at the respective ends thereof, through which the bolts $d$ pass; and said semi-collars $f$, when so connected to the heads of the arms G, form therewith complete collars around the hub C. The flange $e$ of the semi-collars $f$, upon the latter being connected to the heads of the arms G, as described, form with the flange D a complete, radial collar-flange, as will be readily understood.

I secure to the head of each of the arms G, by means of the screws $b$, passing through the flange D, a semi-disk $a$, of wood, the latter being suitably cut-away central of its straight edge, to fit around the exterior surface of the head named, and extending downward therefrom, when the parts are in place. The flange D is let into the face of the wooden semi-disk $a$ about its cut-away portion, to the end that upon the semi-disk $a$ being bolted to the flange D, as shown in Fig. 1, the inner face of said flange shall be flush with the inner face of the semi-disk $a$.

I correspondingly secure to the collar $f$, a like semi-disk $a'$, which extends upward from said semi-collar, upon the parts being assembled, and which is adapted to form with the semi-disk $a$, a complete disk. In the outer face of this complete disk, near its periphery, there is formed an annular recess, into which recess there is placed an annular, flat ring, $b'$, of brass, the said ring consisting of two sections and being retained within said recess by means of suitable screws.

The armature-shaft I is journaled at either end in the arms G, at a point midway between the soft-iron pieces H, H'; and upon this shaft there is mounted a spool or drum $i$, of wood or other suitable non-conducting material. The drum $i$, carries upon its peripheral face the soft-iron rings $i'$, the latter being transversely wound at intervals with suitable insulated wire $j$. The coils thus formed correspond in number with the parallel commutator-strips $k$, which are arranged in a series about the shaft I; and each of said strips $k$ is provided with a radial arm $k'$, at its center, and with a radial arm $k''$ at its inner end. I insulate each of the strips $k$ from the adjoining ones, by placing between said strips a thin film of asbestus, or other suitable non-conducting agent; and I insulate said strips $k$ from the shaft I by giving that portion of said shaft along which said strips lie a coating of asbestus, or other suitable non-conducting material; and I thus insulate said shaft before placing said strips in position.

The respective soft-iron pieces H, H', are suitably insulated from the arms G, at the junctions thereof with said arms.

The upper half of the respective drums $i$, K, of the armature, is inclosed by the casing L, (Fig. 3) which extends downward upon all sides thereof, from the soft-iron piece H; and the lower half of each of said drums is inclosed by a like casing which extends upward, upon all sides thereof, from the soft-iron piece H'; the said casings nearly, but not quite meeting.

The wire $j$ is coiled around the rings $i'$ of the drum $i$, so that the end of each coil is connected to the outer end of the radial arm $k''$ of one of the parallel strips $k$, and the commencement of the succeeding coil is likewise connected to this same arm $k''$,—the end of the succeeding coil being connected to the radial arm $k''$ of the next parallel strip $k$, and so on till the different coils have been connected with the different parallel strips; and the coils of the opposite armature rings $i'$ are correspondingly connected to the radial-arms $k'$. The parallel strips $k$ are formed from brass, and they, in a measure, are held in position along the shaft I by the spool or drum K, which is passed endwise over said strips. This drum K, like the drum $i$, is also formed from wood or other non-conducting material. The drums $i$, K, are each provided with a peripheral flange $l$, which obviates inward displacement of the rings $i'$; and displacement of said rings in the opposite direction, is obviated through the connections of the coils $j$, with the respective radial arms $k'$ $k''$ of the strips $k$.

Intermediate of the respective radial arms $k'$, $k''$, of the parallel strips $k$, I place the semi-sleeve $n$, of suitable, non-conducting material. This semi-sleeve $n$ takes around the parallel strips $k$ which are distributed along the upper half of the shaft I; and I place a like sleeve $n'$ intermediate of the radial arms $k'$, $k''$, of the parallel strips $k$ which are distributed along the lower half of the shaft I, said last-named semi-sleeve being adapted to take around the parallel strips last named, and forming with the semi-sleeve $n$ a complete sleeve, the two semi-sleeves, and consequently the strips $k$, being held firmly in place by the pinion $m$, the latter being formed in two sections and bolted around the said semi-sleeves at a point central thereof.

The soft-iron piece H is provided with two cores M, formed integral therewith and suitably wound with insulated wire $m'$, which serve as one set of field magnets to the dynamo; and the soft-iron piece H' is provided with like cores M', correspondingly formed and wound, which serve as a second set of field-magnets to the dynamo.

The parallel commutator-strips $k$, project outward from the drum K, thereby permitting the brushes $q$, $q'$, to at all times stand in contact therewith, the said brushes $q$, $q'$, being respectively carried by the bolts $r$, $r'$, at the point-ends thereof, the said bolts passing through that arm G, which is adjacent to the projecting ends of said commutator-strips. The disposition of the brushes $q$, $q'$, is fully shown in Fig. 3.

The spur-wheel P, formed in two sections, is mounted upon the hub C, central thereof, the two sections of said spur-wheel being secured together by means of suitable bolts passing through the openings $q''$. The spur-wheel P is adapted to mesh at all times with the pinion $m$, a suitable opening being formed in the soft-iron piece H to admit of its so doing.

At a low point in the complete disk formed by the sections $a$, $a'$, to the left of the hub C, I insert a binding-screw $p$, the point of which comes in contact with the inner face of the annular ring $b'$, and one end of the coil $m'$ of the adjacent magnet is connected to said binding-screw.

The respective field-magnets of the dynamo are continuously wound, in the same direction, with the insulated wire $m'$; and the brush $q$ is connected with the field-magnets by the wire $o$. The wire $o'$ leads from the brush $q'$ to the binding-screw $p'$, which passes through the wooden disk, at the right end of the hub C, and comes in contact with the inner face of an annular ring corresponding to $b'$, in the opposite wooden disk.

I secure, by means of the screws $o''$, to the outer face of the respective hub-flanges, a disk $p''$, of suitable, non-conducting material, as wood. This disk is provided with a central opening, and when in place surrounds the outer end of the hub C. There is formed in the outer face of said disk $p''$ an annular recess, into which is let an annular, flat ring $r''$, which may be held in place by means of small screws, and which is provided at one point therein with a U-shaped arm $s$, the latter being formed integral with said ring $r''$, extending to and around the periphery of the hub-flange D, and terminating in a flexible brush $s'$, upon the opposite side of said hub-flange, the said brush $s'$ being adapted to press against the annular ring $b'$.

To each of the arms A, of the bicycle-fork, I secure by means of the screws $s''$, a plate $t$, of non-conducting material, and against said plate I place the brush $t'$, holding the same thereto by means of the binding-screw $t''$. The brush $t'$ is adapted to press against the annular ring $r''$.

The lamp consists of the bulb-compartment A' and the regulator-compartment B', each having walls of non-conducting material; and said lamp, is secured, in any convenint manner, to the upper portion of the bicycle-fork.

The wire $u$, (Fig. 1,) leads to the binding-screw $u'$, (Fig. 4) which, with the binding-screw $u''$, serves to secure the plate $v$ to the rear wall of the regulator compartment. There is also secured to the rear wall of the regulator compartment above the plate last named, a plate $v'$, to which is secured the magnet R, consisting of a spool or drum of non-conducting material, and having a soft-iron tube inserted therein. One end of the coil of this magnet is connected to the binding screw $u''$, and the other end of said coil is connected to the brass plate $v''$, the latter being secured to the rear wall of the regulator compartment by means of a screw.

A spindle $w$ is inserted within the tube of the magnet R, said spindle being provided with the stop $w'$, which prevents longitudinal movement of said spindle in one direction. The "head"-end of said spindle is threaded to receive the nut $w''$, against which the bar $a''$ is held through the action of the springs $b''$, the head-end of said spindle passing through a central opening in said bar. The spindle $w$ is made up of sections, the one within the tube of the magnet R being of wood, the next of soft-iron, the next of brass, and the next, or tip of the spindle, being of carbon, said tip being tapering in form. The spring-arms $c'$ extend obliquely from the brass plates $v''$, $c''$, (the latter being secured to the rear wall of the regulator compartment obliquely above the former,) in opposite directions, and press against opposite sides of the spindle $w$. Should an electric current of slightly undue intensity be generated, upon the bicycle being propelled at a high rate of speed, the magnet R will attract the soft-iron section of the spindle $w$, thereby causing said spindle to move longitudinally in the direction to bring the carbon tip of the spindle in connection with the upper spring-arm $c'$, which extends obliquely downward from the brass plate $c''$, while the other spring-arm will remain in connection with the brass section of said spindle; and should the strength of the current become, at any time, still more intense, the magnet R will more strongly attract the soft-iron section of the spindle, thereby causing both spring-arms $c'$ to come in contact with the tip of the spindle, which, being a poor conductor, may become heated, and allow a portion of the current to escape thereby, without reaching the filament of the lamp. The spring-arms $c'$ may be secured to the plates $v''$, $c''$, in any convenient manner. This form of rheostats, however, I reserve as the subject of a future application.

The angle-arm O is formed integral at one end thereof with the plate $c''$, and is provided at its other end with a metallic ring S, having interior threads, said ring S being adapted to fit into the ring S', the latter being of non-conducting material and being secured by means of screws T, to the upper wall of the regulator compartment, around a suitable opening therein, one of said screws T also serving to hold the arm O in place.

The wire U, (Fig. 1) leads from the brush $t'$ to the binding-screw $d'$, of the plate $d''$, within the regulator compartment. This plate last named is angular in form and fits around the lower end of the wooden stud $e'$, the said plate and the lower end of said stud, being held in position by the screws $f'$, which pass through said plate, through the lower end of said stud, and take into the side-wall of the regulator-compartment. The plate $d''$ is provided with a spring-arm $f''$ which extends inwardly therefrom.

The plate $g'$, and the upper end of the stud $e'$, are held in position by the screws $g''$, which pass through these parts and also take into the side-wall of the regulator-compartment. This latter plate, $g'$, is provided with two inwardly-extending spring-arms V, $h''$, the one corresponding to the arm $f''$, and standing parallel therewith, and the other terminating in a head $i'''$, centrally of and immediately beneath the metallic ring S.

The rod $j''$, (Fig. 5,) passes transversely through the regulator-compartment, bearing at one end thereof in the front wall, and at the other end in the rear wall of said compartment, said rod projecting outward from the latter wall, and carrying the button $l'$. Within the regulator-compartment the rod $j''$ carries a small drum of nonconducting material, having detents at opposite sides thereof, and centrally within said drum I place a metallic strip $l''$, the projecting ends of which form detents corresponding to the detents first mentioned. The detents of the drum referred to are adapted to engage the spring-arms $f''$, $h''$, and it will be understood that by rotating the button $l'$ the circuit may be readily broken or "closed." I also reserve this form of cut-out as the subject of a future application.

The vacuum-bulb of the lamp is provided with a threaded glass base, formed with two circuit-wires therein, the lower end of one of which is connected to a thin, metallic, threaded-sleeve, surrounding the glass base, and the lower end of the other wire being joined to a small metallic plate, at the lower end of the glass base. The sleeve above named comes in contact with the metallic ring S, and the small, metallic plate, above named, comes in contact with the head $i''$ of the spring-arm V, upon the base of the lamp-bulb being screwed into the ring S. The upper ends of the wires within the said glass base are connected by the filament $m''$, as in prior lamps.

A bicycle-lamp constructed as herein described, being simple in construction and efficient in operation, it is believed will prove of great commercial value.

Having fully described my invention, what I claim, and desire to secure by Letters Patent, is—

1. In combination with a bicycle-wheel, having a spur-wheel mounted upon the hub thereof, the arms G, each having a head adapted to partially encircle the said wheel-hub, the magnet-pieces H, H', connecting the arms G centrally and at the lower ends thereof, respectively, the shaft I, journaled at either end in the arms G, intermediate of the magnet-pieces H, H', and carrying armature and commutator parts substantially as herein described, the pinion $m$, carried by the shaft I and adapted to mesh with said spur-wheel, the semi-collars $f$, each adapted to partially encircle said hub, and form with the head of one of the arms G, a complete collar around said hub, the non-conductive, semi-disks $a$, $a'$, disposed as herein stated and forming a complete disk around the wheel-hub, the annular metallic ring $b'$, let into the outer face of the disk just referred to, and the binding-screw $p$, the latter being disposed so as to come in contact with the metallic ring $b'$, and having suitable connection with one of the magnets M, all substantially as herein described and for the purposes specified.

2. The combination with a bicycle-wheel having a spur-wheel mounted upon the hub thereof, of the arms G, each having a head adapted to fit around the lower half of the hub of a bicycle-wheel, the semi-collars $f$, each adapted to fit around the upper half of the hub of a bicycle-wheel, and form with the head of one of the arms G, a complete collar around said hub, the horizontal magnet-pieces H, H', connecting said arms G centrally and at the lower ends thereof, respectively, a horizontal shaft, carrying armature and commutator parts, and a pinion, substantially as described, said shaft being journaled at either end in the arms G, intermediate of the respective magnet pieces H, H', and said pinion being formed in two sections, taking around and holding the commutator strips in place, and being adapted to mesh with the spur-wheel named, substantially as herein described and for the purposes set forth.

3. The combination with a bicycle-wheel having a spur-wheel mounted upon the hub thereof, of a dynamo-electric machine, substantially as described, suspended from the hub of said wheel, as by means of the arms G, said dynamo-electric machine having a horizontal shaft carrying suitable armature and commutator parts, and a pinion, the latter being adapted to mesh with said spur-wheel, all substantially as described and for the purposes set forth.

GEORGE MAYR.

Witnesses:
J. M. STEWART,
FR. NEMO ROEHRICT.